United States Patent
Sugiyama

(10) Patent No.: US 7,788,011 B2
(45) Date of Patent: Aug. 31, 2010

(54) BRAKING AND DRIVE FORCE CONTROL APPARATUS FOR A VEHICLE

(75) Inventor: Mizuho Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 770 days.

(21) Appl. No.: 11/234,206

(22) Filed: Sep. 26, 2005

(65) Prior Publication Data

US 2006/0076740 A1    Apr. 13, 2006

(30) Foreign Application Priority Data

Oct. 7, 2004    (JP) .............................. 2004-294578

(51) Int. Cl.
*G06F 7/00* (2006.01)
*G06F 17/00* (2006.01)
*B62D 6/00* (2006.01)
*B62D 11/00* (2006.01)
*B62D 11/02* (2006.01)
*B60S 9/00* (2006.01)
*F16F 9/50* (2006.01)
*G05D 1/00* (2006.01)
*B60T 7/12* (2006.01)

(52) U.S. Cl. ........................ 701/69; 180/204; 180/6.2; 188/281; 701/81

(58) Field of Classification Search ........................ None
See application file for complete search history.

(56) References Cited

U.S. PATENT DOCUMENTS

| | | | | |
|---|---|---|---|---|
| 5,154,437 A | * | 10/1992 | Inagaki et al. | 180/411 |
| 6,000,702 A | * | 12/1999 | Streiter | 280/5.507 |
| 6,424,907 B1 | * | 7/2002 | Rieth et al. | 701/124 |
| 6,593,849 B2 | * | 7/2003 | Chubb et al. | 340/446 |
| 6,904,351 B1 | * | 6/2005 | Hac | 701/70 |
| 6,909,959 B2 | * | 6/2005 | Hallowell | 701/88 |

(Continued)

FOREIGN PATENT DOCUMENTS

JP    A 02-262806    10/1990

(Continued)

OTHER PUBLICATIONS

Japanese Office Action with partial translation dated Dec. 22, 2009 for Japanese Patent Application No. 2004-294578.

*Primary Examiner*—Khoi Tran
*Assistant Examiner*—Nicholas Kiswanto
(74) *Attorney, Agent, or Firm*—Oliff & Berridge, PLC

(57) ABSTRACT

A braking and drive force control apparatus for a vehicle whose wheels are separately driven by electric motors. A controller calculates a drive force or a braking force to be applied to each wheel in accordance with the average sprung displacement and average sprung velocity of the vehicle body which are calculated based on sensed sprung acceleration. By adding the calculated drive force or braking force to the drive force at the time of running, at the time of bouncing of the vehicle body, a downwards force can be generated in the vehicle body which is rising, and an upwards force can be generated in the vehicle body which is descending. By applying an upwards or downwards force to each wheel so as to permit upwards and downwards vibration of the wheels, variations in the ground contact load can be suppressed.

7 Claims, 9 Drawing Sheets

U.S. PATENT DOCUMENTS

| | | | |
|---|---|---|---|
| 7,340,368 B2 * | 3/2008 | Fiedler et al. | 702/145 |
| 7,423,393 B2 * | 9/2008 | Wakao et al. | 318/371 |
| 2002/0013651 A1 * | 1/2002 | Weiberle et al. | 701/71 |
| 2003/0036837 A1 * | 2/2003 | Katayama et al. | 701/69 |
| 2005/0143896 A1 * | 6/2005 | Sawada et al. | 701/96 |
| 2005/0263332 A1 * | 12/2005 | Chernoff et al. | 180/65.1 |

FOREIGN PATENT DOCUMENTS

| | | |
|---|---|---|
| JP | A 05-328542 | 12/1993 |
| JP | A 10-210604 | 8/1998 |
| JP | A 11-187506 | 7/1999 |
| JP | A 2002-301939 | 10/2002 |
| JP | A 2005-119548 | 5/2005 |

* cited by examiner

FIG.8
(A)
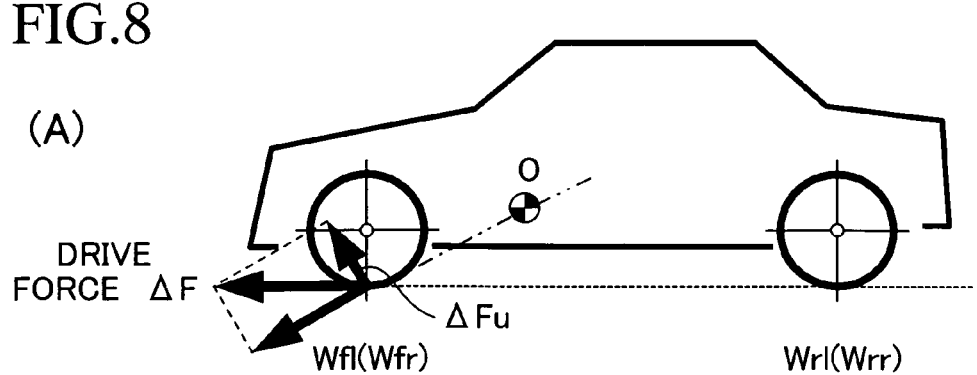
(B)
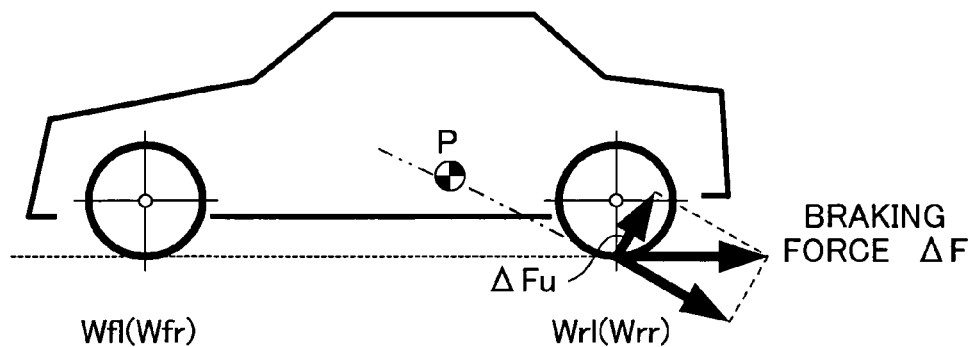
(C)
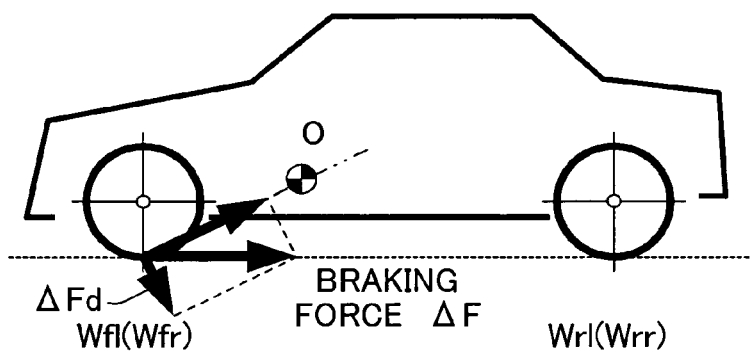
(D)
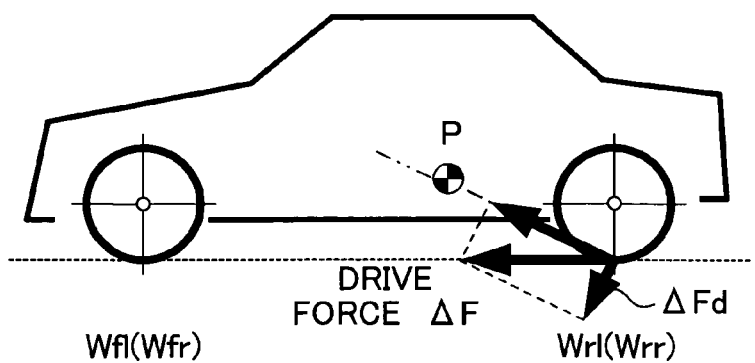

BRAKING AND DRIVE FORCE CONTROL APPARATUS FOR A VEHICLE

BACKGROUND OF THE INVENTION

1. Technical Field

This invention relates to a braking and drive force control apparatus for a vehicle which can perform variable control of the braking and drive force applied to the wheels of the vehicle.

2. Related Art

From in the past, as described in Japanese Patent Application Laid-Open (kokai) No. H 10-210604, for example, an in-wheel motor type vehicle in which a motor is incorporated into each drive wheel is known. The drive force of each drive wheel is individually controlled so that the yaw rate response of the vehicle body to the steering angle sensed by a steering angle sensor matches a target response, and the yawing performance is improved by reflecting rotational movement, sideways movement, slip, and the like of the vehicle body in drive control of each drive wheel.

However, the above-described prior art does not give adequate consideration to upwards and downwards vibration of the vehicle body, i.e., to bouncing of the vehicle body. Bouncing of the vehicle body is usually suppressed by setting the suspension on the hard side, such as by increasing the spring constant of coil springs or by setting the damping force of shock absorbers of the vehicle to a high value. However, suppressing bouncing in this manner results in the problem that the ride comfort becomes poor.

In addition, in the above-described prior art, adequate consideration is not given to variations in the ground contact load of the wheels. In the same manner as described above, variation in the ground contact load of the wheels is suppressed by setting the suspension on the hard side, but again this results in the problem that the ride comfort worsens.

SUMMARY OF THE INVENTION

The present invention was made in order to cope with the above-described problems, and its object is to provide a braking and drive force control apparatus for a vehicle which does not require the suspension to be set on the hard side and thus can maintain ride comfort and which can control the drive force of wheels in accordance with upwards and downwards vibration of vehicle parts such as the vehicle body or the wheels, in order to suppress bouncing of a vehicle body to thereby achieve running stability of the vehicle, and to suppress variations in the ground contact load of the wheels to thereby achieve running stability of the vehicle.

In order to achieve the above-described object, according to one form of the present invention, a braking and drive force control apparatus for a vehicle which has four actuators which independently drive four wheels suspended on a vehicle body by a suspension apparatus and which can independently control the braking and drive forces generated by the four actuators comprises a vehicle body upwards and downwards vibration sensing means which senses upwards and downwards vibration of the vehicle body, and a braking and drive force control means which produces a difference in the braking and drive forces generated by the four actuators in accordance with the sensed upwards and downwards vibration of the vehicle body to thereby apply a force to the vehicle body in a direction for suppressing the upwards and downwards vibration of the vehicle body. The braking and drive force control means may be a means which produces a difference in the braking and drive forces generated by the four actuators such that forces are generated in the front and rear wheels in opposite directions with respect to the fore and aft direction of the vehicle so that a downwards force is generated in the vehicle body when the vehicle body has risen, or it may be a means which produces a difference in the braking and drive forces generated by the four actuators such that forces are generated in the front and rear wheels in opposite directions with respect to the fore and aft direction of the vehicle so that an upwards force is generated in the vehicle body when the vehicle body has descended.

The vehicle body upwards and downwards vibration sensing means may include a sprung acceleration sensor which senses the sprung acceleration of the vehicle body in the upwards and downwards direction with respect to absolute space and a bouncing sensing means which senses bouncing of the vehicle body using the sensed sprung acceleration. The braking and drive force control means may comprise a braking and drive force calculating means which calculates the braking and drive force to be generated by the four actuators in accordance with the sensed bouncing of the vehicle body and a drive force control means which drives and controls the four actuators in accordance with the calculated braking and drive force. In this case, the bouncing sensing means may include, for example, a sprung displacement calculating means which calculates the sprung displacement of the vehicle body in the upwards and downwards direction using the sensed sprung acceleration, and bouncing of the vehicle body may be sensed when the calculated sprung displacement is at least a prescribed value.

If a difference in the drive forces of the front and rear wheels is created in accordance with the upwards and downwards vibration of the vehicle body which is sensed by the vehicle body upwards and downwards vibration sensing means, force can be applied in the direction suppressing upwards and downwards vibration of the vehicle body. Namely, the wheels are suspended on the vehicle body through the suspension apparatus, so if a difference is produced in the drive forces of the front and rear wheels, the forces in the fore and aft direction of the vehicle which are generated by the front and rear wheels can be applied to the vehicle body through the suspension. As a result, the suspension is not set on the hard side, and thus ride comfort can be maintained. Further, without setting the suspension on the hard side, bouncing of the vehicle body can be suppressed, and the running stability of the vehicle can be achieved.

According to another form of the present invention, a braking and drive force control apparatus for a vehicle which has four actuators which independently drive four wheels suspended on a vehicle body through a suspension apparatus and which can independently control the braking and drive force generated by the four actuators comprises a wheel upwards and downwards vibration sensing means which senses the upwards and downwards vibration of each wheel, and a braking and drive force control means which changes the braking and drive force generated by the actuator corresponding to each wheel in accordance with the sensed upwards and downwards vibration of the corresponding wheel and applies the force in the direction permitting upwards and downwards vibration of the corresponding wheel. In this case, the braking and drive force control means may be, for example, a means which changes the braking and drive force generated by the actuator corresponding to a rising wheel so as to generate an upwards force in the wheel or a means which changes the braking and drive force generated by the actuator corresponding to a descending wheel so as to generate a downwards force in the wheel. The upwards and downwards vibration sensing means for each wheel may, for example, be a means which senses unsprung acceleration of each wheel in the upwards and downwards direction with respect to absolute space. The braking and drive force control means may include a braking and drive force calculating means which calculates a braking and drive force generated by the actuator corresponding to each wheel in accordance with the sensed unsprung acceleration, and a drive force control means which drives and controls the actuators in accordance with the calculated braking and drive force.

If the drive force of the wheels is changed in accordance with the upwards and downwards vibration of the wheels which is sensed by the wheel upwards and downwards vibration sensing means, a force in the direction permitting upwards and downwards vibration of the wheels can be applied. Namely, the wheels are suspended on the vehicle body by the suspension, so a component of the force in the fore and aft direction of the vehicle which is generated at the wheels can be applied to the suspension, and other components of force in the fore and aft direction can be applied to the wheels. The wheels can be made to follow the ground surface and move upwards and downwards by the force applied to the wheels. As a result, the suspension is not set on the hard side, and thus ride comfort can be maintained. Further, without setting the suspension on the hard side, variation of the ground contact load can be suppressed, and running stability of the vehicle can be achieved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 8(A) and 8(B) are schematic side elevations for explaining braking and drive force control for the front wheels and rear wheels, respectively, of the vehicle when the wheels are moving upward, and FIGS. 8(C) and 8(D) are schematic side elevations for explaining braking and drive force control for the front wheels and rear wheels, respectively, of the vehicle when the wheels are moving downwards.

DESCRIPTION OF PREFERRED EMBODIMENTS a. First Embodiment

Figure 1:
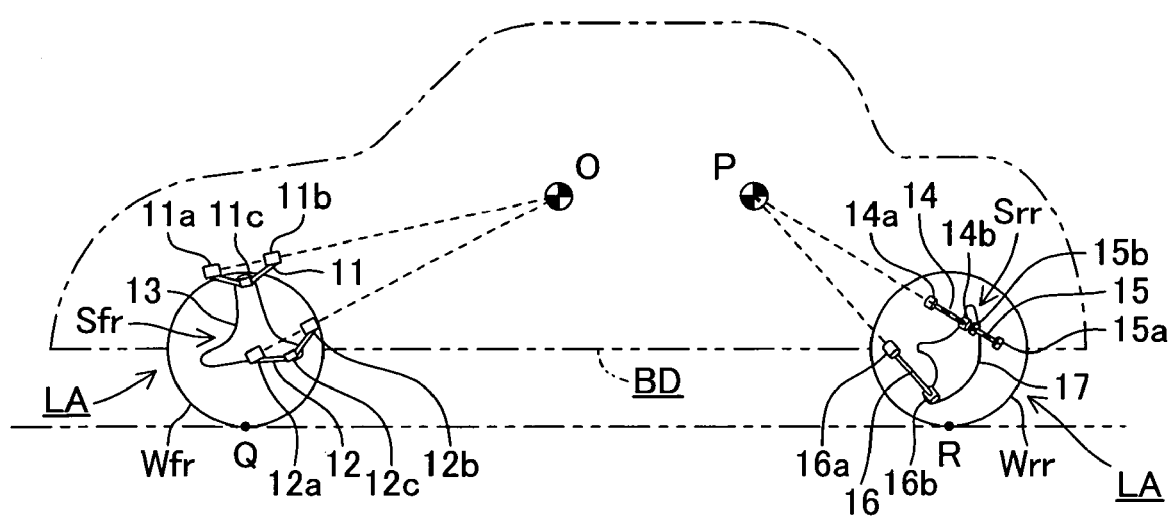
FIG. 1 is a schematic side elevation showing the right inside of a vehicle equipped with a braking and drive force control apparatus according to a first embodiment of the present invention.

Below, a braking and drive force control apparatus according to a first embodiment of the present invention will be described while referring to the drawings. FIG. 1 is a schematic side view showing the righthand portion of a vehicle.

Figure 2:
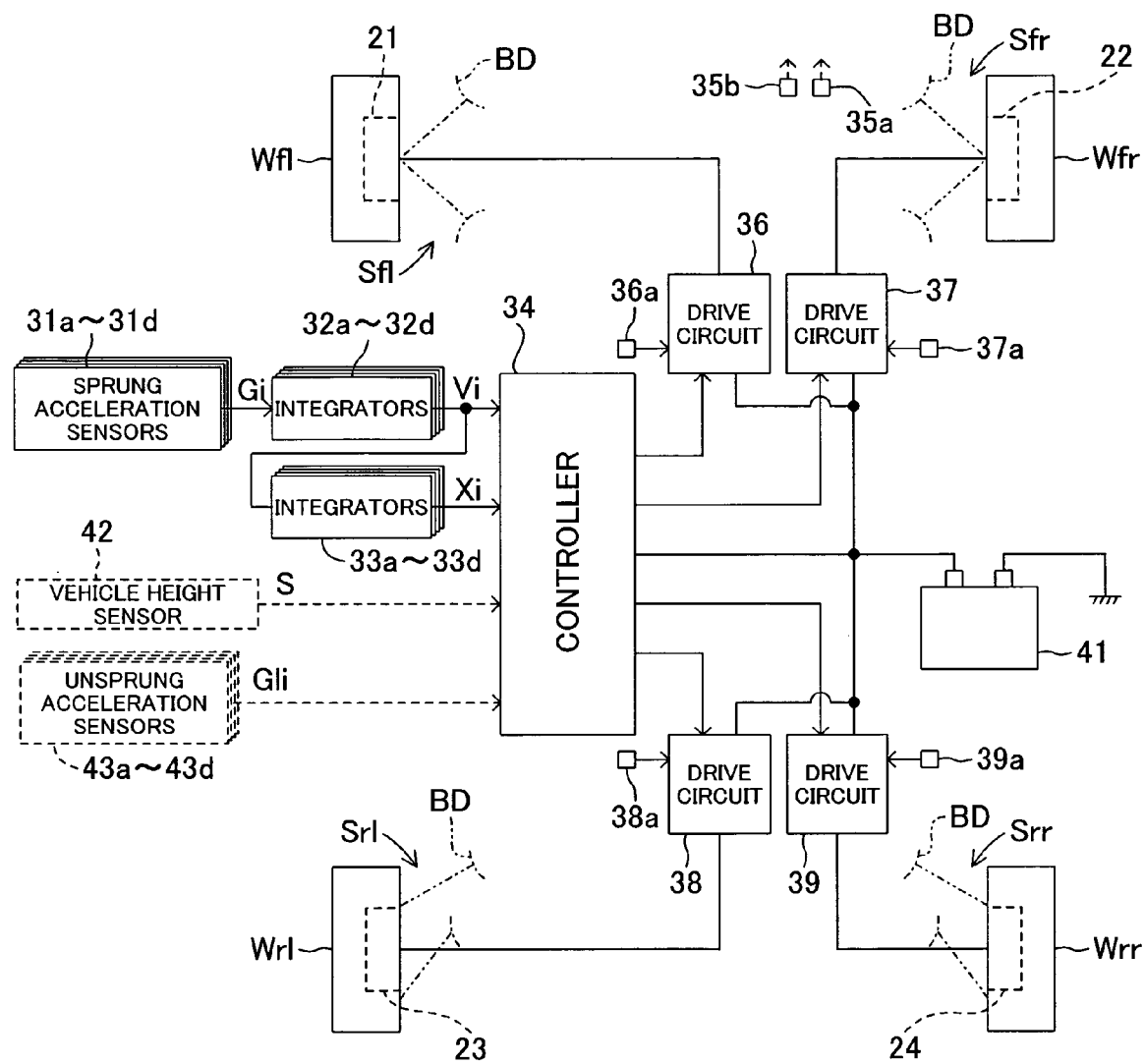
FIG. 2 is a block diagram of an electric control apparatus of the braking and drive force control apparatus according to the first embodiment.

The left and right, front and rear wheels Wfl, Wfr, Wrl, and Wrr of the vehicle are suspended on a vehicle body BD by suspensions Sfl, Sfr, Srl, and Srr (see FIG. 2). The suspensions Sfl, Sfr, Srl and Srr have the same structure on the left and right sides of the vehicle, so only the suspensions Sfr and Srr positioned on the right side of the vehicle will be explained in detail, and a detailed explanation of the suspensions Sfl and Srl positioned on the left side of the vehicle will be omitted.

The front suspension Sfr includes an upper arm 11 and a lower arm 12. The upper arm 11 is mounted on the vehicle body BD at its inner ends 11a and 11b for rotation about an axis extending in roughly the fore and aft direction of the vehicle, and is rotatably mounted at its outer end 11c on a carrier 13 which supports the right front wheel Wfr. The lower arm 12 is mounted on the vehicle body BD at its inner ends 12a and 12b for rotation about an axis extending in roughly the fore and aft direction of the vehicle body, and is rotatably mounted on the carrier 13 at its outer end 12c.

The axis of the inner ends 11a and 11b of the upper arm 11 and the axis of the inner ends 12a and 12b of the lower arm 12 intersect at an intersection point O which is positioned above and towards the rear of the vehicle body with respect to the ground contact surface Q of the right front wheel Wfr. This intersection point O is the instant center of the right front wheel Wfr with respect to the vehicle body BD. When, for example, a force acts on the ground contact surface Q of the right front wheel Wfr towards the front of the vehicle, a force corresponding to the forward force acts at the intersection point O in the direction of line segment OQ connecting the intersection point O and the ground contact surface Q. In contrast, when a force acts on the ground contact surface Q of the right front wheel Wfr towards the rear of the vehicle, a force corresponding to the rearward force acts at the intersection point O in the direction of line segment QO.

The rear suspension Srr includes upper arms 14 and 15 and a lower arm 16. The upper arms 14 and 15 are rotatably mounted on the vehicle body BD at their inner ends 14a and 15a, respectively, for rotation about an axis extending in roughly the fore and aft direction of the vehicle and are rotatably mounted at their outer ends 14b and 15b, respectively, on a carrier 17 which supports the right rear wheel Wrr. The lower arm 16 is rotatably mounted on the vehicle body BD for rotation about an axis extending in roughly the fore and aft direction of the vehicle at its inner end 16a, and it is rotatably mounted on the carrier 17 at its outer end 16b.

The axis connecting the inner ends 14a and 15a of the upper arms 14 and 15 and the axis of the inner end 16a of the lower arm 16 intersect at an intersection point P which is located above and towards the front of the vehicle with respect to the ground contact surface R of the right rear wheel Wrr. Intersection point P is the instant center of the right rear wheel Wrr with respect to the vehicle body BD. When, for example, a force acts on the ground contact surface R of the right rear wheel Wrr towards the rear of the vehicle, a force corresponding to the rearwards force acts at the intersection point P in the direction of the line segment PR connecting the intersection point P and the ground contact surface R. In contrast, when a force towards the front of the vehicle acts on the ground contact surface R of the right rear wheel Wrr, a force corresponding to the forward force acts at the intersection point P in the direction of line segment RP.

As shown in FIG. 2, the unillustrated rotational shafts of electric motors 21-24 which are incorporated into the wheels are integrally mounted on the left and right, front and rear wheels Wfl, Wfr, Wrl, and Wrr, respectively, of the vehicle. The electric motors (in-wheel motors) 21-24 have internal reduction gears, and the left and right, front and rear wheels Wfl, Wfr, Wrl, and Wrr are independently driven by their rotation.

Next, an electric control apparatus which controls the braking and drive force of the electric motors 21-24 will be described. This electric control apparatus includes sprung acceleration sensors 31a-31d. The sprung acceleration sensors 31a-31d are mounted on the vehicle body BD in positions corresponding to the left and right, front and rear wheels Wfl, Wfr, Wrl, and Wrr. They sense the sprung acceleration Gi (i=1-4) of the vehicle body BD in the upwards and downwards direction with respect to absolute space. The sprung acceleration sensors 31a-31d are connected to a controller 34 through integrators 32a-32d and 33a-33d.

Integrators 32a-32d integrate the signals from the sprung acceleration sensors 31a-31d indicating the sprung acceleration Gi (i=1-4), and thereby convert the sprung acceleration Gi (i=1-4) into sprung velocity Vi (i=1-4) indicating the absolute velocity in the upwards and downwards direction of the vehicle body BD. Integrators 33a-33d integrate the signals from integrators 32a-32d indicating the sprung velocity Vi (i=1-4) and thereby convert the sprung velocity Vi (i=1-4) into sprung displacement Xi (i=1-4) indicating the absolute displacement of the vehicle body BD in the upwards and downwards direction. The sprung acceleration Gi (i=1-4), the sprung velocity Vi (i=1-4), and the sprung displacement Xi (i=1-4) are in the upwards direction when positive and are downwards when negative. The sprung acceleration sensors 31a-31d, integrators 32a-32d, and integrators 33a-33d function as a vehicle body upwards and downwards vibration sensing means.

Figure 3:
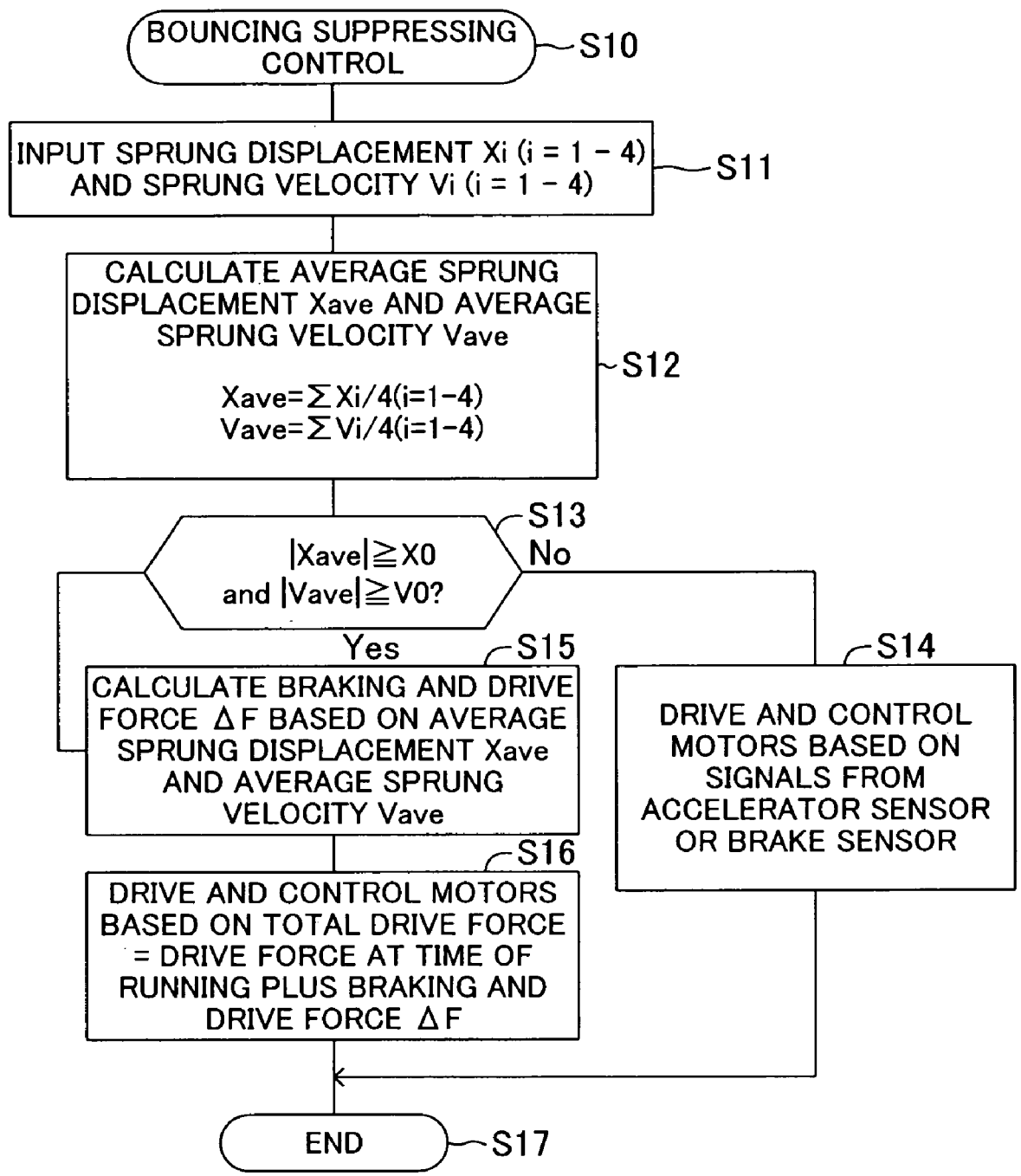
FIG. 3 is a flow chart relating to the first embodiment and showing a bouncing suppressing control program executed by the controller of FIG. 2.

The controller 34 comprises a microcomputer having a CPU, a ROM, a RAM, and the like as principal components. The controller 34 controls the operation of the electric motors 21-24 by executing the bouncing suppressing control program shown in FIG. 3. The controller 34 is connected to the sprung acceleration sensors 31a-31d as well as to an accelerator sensor 35a, a brake sensor 35b, and drive circuits 36-39. The accelerator sensor 35a senses the amount of depression of an unillustrated accelerator pedal of the vehicle and outputs a signal indicating the sensed amount of depression. The brake sensor 35b senses the amount of depression of an unillustrated brake pedal of the vehicle and outputs a signal indicating the sensed amount of depression.

The drive circuits 36-39 receive electric power from a battery 41 and are respectively connected to current sensors 36a-39a which sense the current flowing to the electric motors 21-24. In response to instructions from the controller 34, the drive circuits 36-39 control the electric motors 21-24 in cooperation with the current sensors 36a-39a to drive the left and right, front and rear wheels Wfl, Wfr, Wrl, and Wrr. When the vehicle body BD is not experiencing upwards and downwards vibration, the controller 34 controls the rotation of the electric motors 21-24 through the drive circuits 36-39 in accordance with the signals from the accelerator sensor 35a or the brake sensor 35b indicating the sensed amount of depression of the accelerator pedal or brake pedal so as to brake or drive the left and right, front and rear wheels Wfl, Wfr, Wrl, and Wrr with the same braking force or drive force. Instead of the current sensors 36a-39a, torque sensors which sense the braking and drive torque of the left and right, front and rear wheels Wfl, Wfr, Wrl, and Wrr may be provided.

Next, the operation of the first embodiment having the above-described structure will be described. At prescribed short time intervals, the controller 34 repeatedly executes the bouncing suppressing control program shown in FIG. 3. The execution of this program begins in Step S10. In Step S11, values indicating the sensed sprung displacement Xi (i=1-4) are input from integrators 33a-33d, values indicating the sensed sprung velocity Vi (i=1-4) are input from integrators 32a-32d, and then the processing of Step S12 and onwards is performed.

In Step S12, the average sprung displacement Xave (=ΣXi/4(i=1-4)) is calculated based on the sprung displacement Xi (i=1-4) input in Step S11, and the average sprung velocity Vave (=ΣVi/4(i=1-4)) is calculated based on the sprung velocity Vi (i=1-4) input in Step S11. After the processing of Step S12, in Step S13, it is determined whether the absolute value |Xave| of the average sprung displacement is at least a prescribed value X0 and whether the absolute value |Vave| of the average sprung velocity is at least a prescribed value V0. The determination in Step S13 senses whether the vehicle body BD is undergoing bouncing.

First, the case in which the vehicle is traveling straight ahead on a flat road surface will be described. In this case, the controller 34 makes a determination of No in Step S13 and then performs the processing of Step S14. In Step S14, the controller 34 controls the rotation of the electric motors 21-24 in cooperation with the drive circuits 36-39 in accordance with signals from the accelerator sensor 35a or the brake sensor 35b so as to rotationally drive the left and right, front and rear wheels Wfl, Wfr, Wrl, and Wrr. After the processing of Step S14, the processing of the bouncing suppressing control program is temporarily ended in Step S17.

Next, the case will be described in which the vehicle is traveling on a road surface with undulations and bouncing is occurring in the vehicle body BD, i.e., a case in which the vehicle body BD is vibrating upwards and downwards in a low frequency range of around 2 Hz. In this case, in Step S13, the controller 34 makes a determination of Yes, i.e., a determination that bouncing is occurring in the vehicle body BD, and it executes the processing from Step S15.

In Step S15, a braking and drive force table stored in the ROM of the controller 34 is referred to, and the braking and drive force ΔF, which changes in accordance with the average sprung displacement Xave and the average sprung velocity Vave, is calculated. As shown by the solid lines in FIG. 4, for each of a plurality of representative average sprung velocities, the braking and drive force table stores a braking and drive force ΔF for the left and right front wheels Wfl and Wfr which increases nonlinearly as the average sprung displacement Xave increases, and as shown by the dashed lines in FIG. 4, for each of the plurality of representative average sprung velocities, it stores a braking and drive force ΔF for the left and right rear wheels Wrl and Wrr which decreases nonlinearly as the average sprung displacement Xave increases.

A positive value for these braking and drive forces $\Delta F$ indicates the application to the wheels of a drive force $\Delta F$ towards the front of the vehicle, and a negative value indicates the application to the wheels of a braking force $\Delta F$ towards the rear of the vehicle. For the same average sprung displacement Xave, the braking and drive forces $\Delta F$ have the same magnitude for the left and right front wheels Wfl and Wfr and the left and right rear wheels Wrl and Wrr, but they are applied in opposite directions from each other in the fore and aft direction of the vehicle. The higher the average sprung velocity, the higher the braking and drive forces $\Delta F$ are set.

In Step S16, the controller 34 drives and controls the electric motors 21-24 in accordance with the total drive force, which is the sum of the drive force during running and the braking and drive force $\Delta F$ added thereto. Specifically, when the vehicle body BD has risen, the average sprung displacement Xave is positive, so in accordance with the average sprung velocity Vave, a drive force $\Delta F$ is added to the drive force at the time of running for the left and right front wheels Wfl and Wfr, and a braking force $\Delta F$ is added to the drive force at the time of running for the left and right rear wheels Wrl and Wrr (see FIG. 4). Accordingly, as shown in FIG. 5(A), in accordance with the added braking or drive force $\Delta F$, forces $\Delta F$ having the same magnitude but in opposite directions in the fore and aft direction of the vehicle are applied to the left and right, front and rear wheels Wfl, Wfr, Wrl, and Wrr.

As a result, in the vehicle body BD which is rising due to bouncing of the vehicle body BD, a downwards force is generated at instant center O which is determined by the suspensions Sfl and Sfr for the left and right front wheels Wfl and Wfr, and a downwards force is generated at instant center P which is determined by the suspensions Srl and Srr for the left and right rear wheels Wrl and Wrr. As a result, upwards movement of the vehicle body BD is suppressed. In this case, the sum of the forces $\Delta F$ generated in the left and right, front and rear wheels Wfl, Wfr, Wrl, and Wrr is 0 as viewed for the vehicle as a whole, so acceleration of the vehicle in the fore and aft direction is not produced, and the forces $\Delta F$ are in opposite directions for the front and rear of the vehicle, so a yawing moment is not produced in the vehicle.

Figure 4:
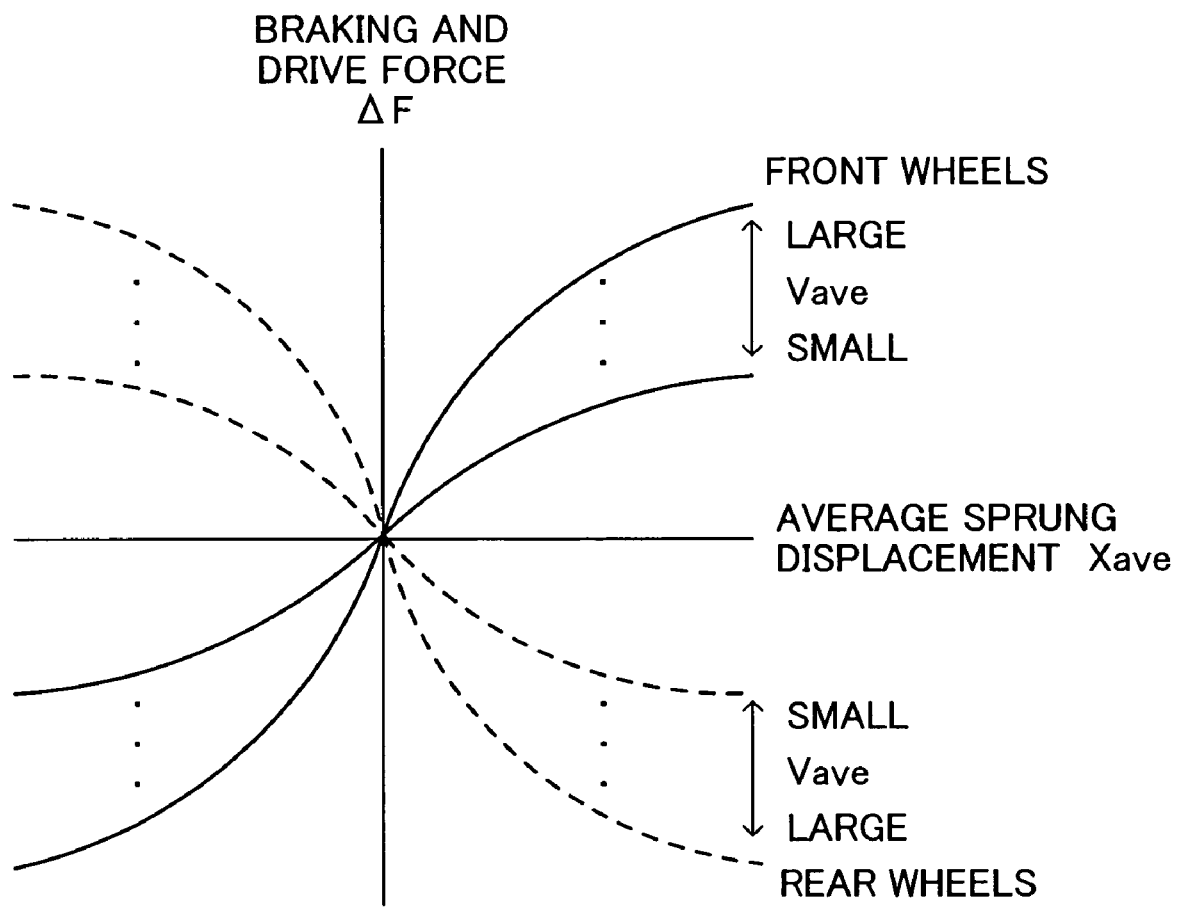
FIG. 4 is a graph showing the braking and drive force as a function of average sprung displacement.
Figure 5:
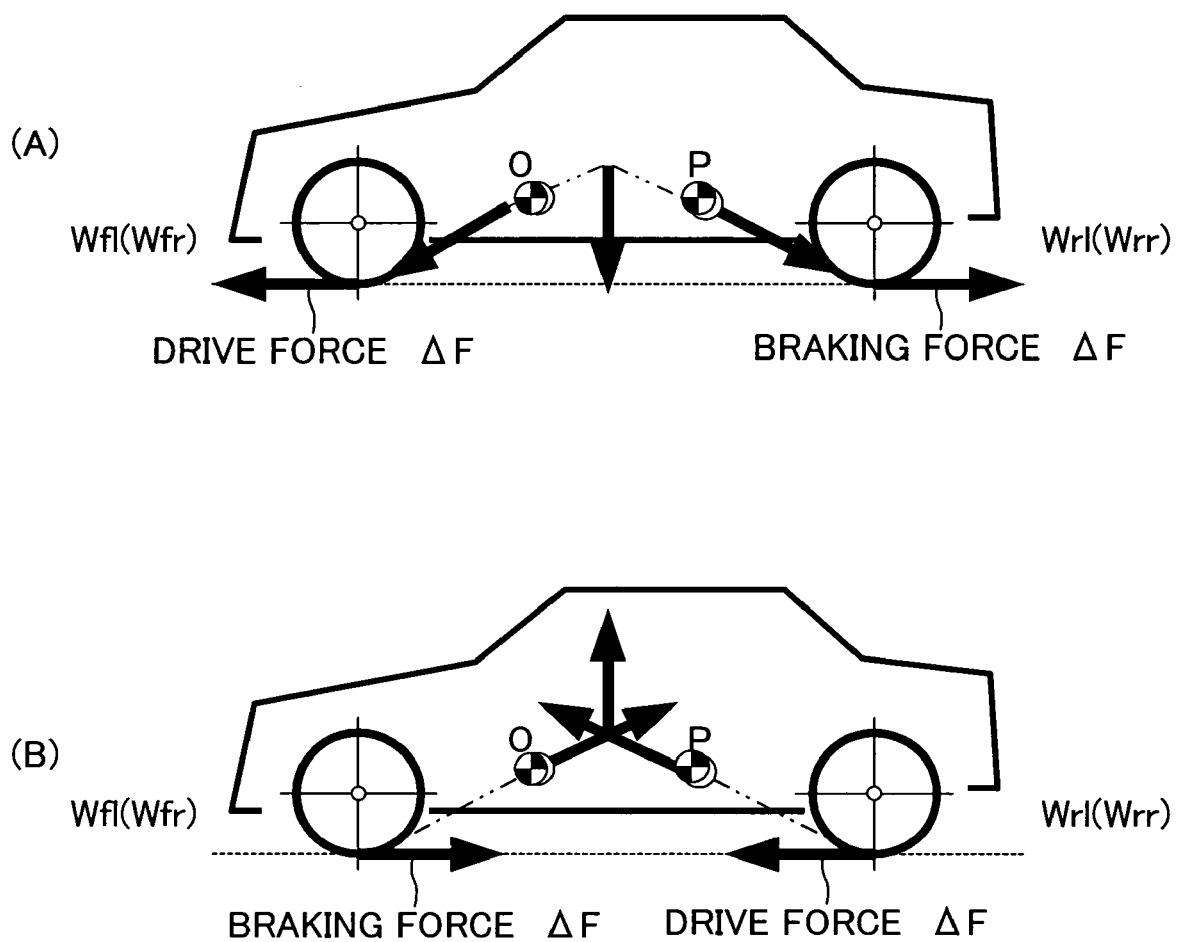
FIG. 5(A) is a schematic side elevation for explaining braking and drive force control when the vehicle body is moving upwards.
FIG. 5(B) is a schematic side elevation for explaining braking and drive force control when the vehicle body is moving downwards.

When the vehicle body is descending, the average sprung displacement Xave is negative, so in accordance with the average sprung velocity Vave, a braking force $\Delta F$ is added to the drive force at the time of running for the left and right front wheels Wfl and Wfr, and a drive force $\Delta F$ is added to the drive force at the time of running for the left and right rear wheels Wrl and Wrr (see FIG. 4). Accordingly, as shown in FIG. 5(B), forces $\Delta F$ of the same magnitude corresponding to the added braking and drive forces $\Delta F$ are applied to the left and right, front and rear wheels Wfl, Wfr, Wrl, and Wrr in opposite directions in the fore and aft direction of the vehicle.

As a result, in a vehicle body BD which is descending due to bouncing of the vehicle body BD, an upwards force is generated at each instant center O determined by the suspensions Sfl and Sfr for the left and right front wheels Wfl and Wfr, and an upwards force is generated at each instant center P determined by the suspensions Srl and Srr for the left and right rear wheels Wrl and Wrr. As a result, downwards movement of the vehicle body BD is suppressed. In this case as well, in the same manner as when the vehicle body BD is moving upwards, the sum of the forces $\Delta F$ which are generated in the left and right, front and rear wheels Wfl, Wfr, Wrl, and Wrr is 0 as viewed for the vehicle as a whole, so acceleration of the vehicle in the fore and aft direction is not produced, and $\Delta F$ is generated in the opposite direction for the front and rear of the vehicle, so a yawing moment is not generated in the vehicle.

After the processing of Step S16, in Step S17, the execution of the bouncing suppressing control program is temporarily ended. When bouncing of the vehicle body BD continues, the processing of Steps S15 and S16 is repeatedly performed. As a result, it is not necessary to set suspension components such as unillustrated coil springs or shock absorbers on the hard side, so ride comfort can be maintained, and running stability of the vehicle can be achieved while suppressing bouncing of the vehicle body.

In the above-described first embodiment, the braking and drive forces $\Delta F$ applied to the left and right, front and rear wheels Wfl, Wfr, Wrl, and Wrr are calculated using a braking and drive force table which stores braking and drive forces $\Delta F$ which vary in accordance with the average sprung displacement Xave. In this case, the braking and drive force $\Delta F$ is set to a magnitude necessary to displace the average sprung displacement Xave to a target position. In the above-described first embodiment, the target position is set to a position in which the relative displacement of the vehicle body BD with respect to an unsprung member LA is 0 when the vehicle is horizontal. For example, it can be set to the vehicle height when the vehicle is starting on a flat road surface. However, the present invention is not limited to the case in which the target position is set in this manner, and as shown by dashed lines in FIG. 2, a vehicle height sensor 42 such as a stroke sensor which senses the stroke of the vehicle body BD with respect to an unsprung member LA can be provided, and the target position can be determined based on the stroke sensed by the vehicle height sensor 42. As a result, bouncing of the vehicle BD due to displacement of the road surface can be suppressed. The present invention is also not limited to the case in which the sprung velocity and sprung displacement are calculated based on the sprung acceleration sensed by sprung acceleration sensors 31a-31d, and bouncing of the vehicle body BD can be determined by the stroke sensed by the vehicle height sensors 42, for example, in addition to or instead of using the sprung acceleration sensors 31a-31d.

b. Second Embodiment

Figure 6:
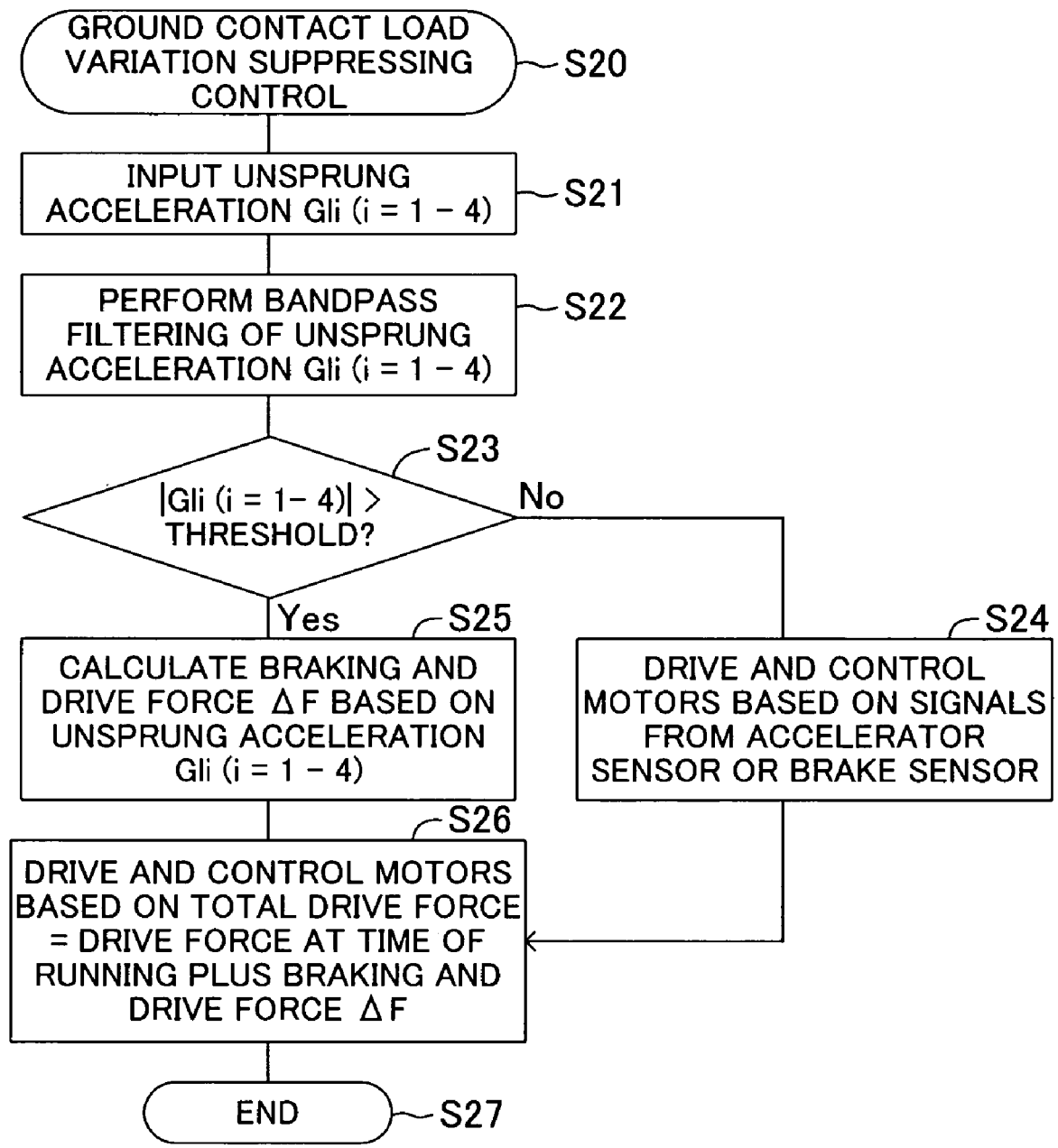
FIG. 6 is a flow chart relating to a second embodiment of the present invention and showing a ground contact load variation suppressing control program executed by the controller of FIG. 2.

Next, a second embodiment of the present invention will be described. As shown by dashed lines in FIG. 2, a braking and drive force control apparatus for a vehicle according to this second embodiment has unsprung acceleration sensors 43a-43d instead of sprung acceleration sensors 31a-31d. The unsprung acceleration sensors 43a-43d are respectively mounted on the lower arms 12, 12, 16, and 16 of the suspensions for the left and right, front and rear wheels Wfl, Wfr, Wrl, and Wrr. They respectively sense the unsprung acceleration Gli (i=1-4) of the left and right, front and rear wheels Wfl, Wfr, Wrl, and Wrr in the upwards and downwards direction with respect to absolute space. A positive value for the unsprung acceleration Gli (i=1-4) indicates upwards acceleration, and a negative value indicates downwards acceleration. The unsprung acceleration sensors 43a-43d function as a wheel upwards and downwards vibration sensing means. A controller 34 according to this second embodiment stores the ground contact load variation suppressing control program shown in FIG. 6 instead of the bouncing suppressing control program shown in FIG. 3 and repeatedly executes this program at prescribed short time intervals. Other portions of this embodiment are the same as in the above-described first embodiment.

Below, the operation of the second embodiment will be described. The controller 34 repeatedly executes the ground contact load variation suppressing control program shown in FIG. 6 at prescribed short time intervals. This program is independently executed for each of the left and right, front and rear wheels Wfl, Wfr, Wrl, and Wrr.

The execution of this ground contact load variation suppressing control program begins in Step S20. In Step S21, sensed values indicating the unsprung acceleration Gli (i=1-4) are read in from the unsprung acceleration sensors 43a-43d respectively, and then the processing of Step S22 and onwards is executed.

In Step S22, the unsprung acceleration Gli (i=1-4) is subjected to band pass filter processing so as to obtain unsprung acceleration Gli (i=1-4) in an unsprung resonant band. Next, in Step S23, it is determined whether the absolute value of the obtained unsprung acceleration Gli (i=1-4) in the unsprung resonant band is at least a prescribed threshold value. Here, the case will be described in which the vehicle is traveling straight ahead on a flat road surface. In this case, none of the left and right, front and rear wheels Wfl, Wfr, Wrl, and Wrr is experiencing vibrations, so a determination of No is made in Step S23, and the processing of Step S24 is executed.

In Step S24, in the same manner as in the processing of Step S14 in the above-described first embodiment, the controller 34 controls the rotation of the electric motors 21-24 in cooperation with the drive circuits 36-39 in accordance with the signals from the accelerator sensor 35a or the brake sensor 35b so as to rotationally drive the left and right, front and rear wheels Wfl, Wfr, Wrl, and Wrr. After the processing of Step S24, the execution of the ground contact load variation suppressing control program is temporarily ended in Step S27.

Next, the case will be described in which the vehicle is traveling on a road surface having many small irregularities, and the left and right, front and rear wheels Wfl, Wfr, Wrl, and Wrr are vibrating upwards and downwards in a high frequency range of around 10 some Hz. In this case, in Step S23, the controller 34 makes a determination of Yes, namely, a determination that the left and right, front and rear wheels Wfl, Wfr, Wrl, and Wrr are undergoing resonant vibration, and the processing from Step S25 is performed.

In Step S25, the braking and drive force $\Delta F$, which varies in accordance with the unsprung acceleration Gli (i=1-4), is calculated by referring to a braking and drive force table stored in the ROM of the controller 34. This braking and drive force table stores the braking and drive force $\Delta F$ for the left and right front wheels Wfl and Wfr which increases nonlinearly as the unsprung acceleration Gli (i=1-4) increases, as shown by the solid line in FIG. 7, and it stores the braking and drive force $\Delta F$ for the left and right rear wheels Wrl and Wrr which decreases nonlinearly as the unsprung acceleration Gli (i=1-4) increases, as shown by the dashed line in FIG. 7. A positive value for the braking and drive force $\Delta F$ indicates that a drive force $\Delta F$ is applied to a wheel towards the front of the vehicle, and a negative value indicates that a braking force $\Delta F$ is applied to a wheel towards the rear of the vehicle.

In Step S26, the electric motors 21-24 are driven and controlled in accordance with the total drive force, which is the sum of the drive force at the time of running and the braking and drive force $\Delta F$ added thereto. Specifically, when the left front wheel Wfl is experiencing a positive unsprung acceleration Gl1 and the left front wheel Wfl is rising due to the left front wheel Wfl riding over a bump in the road surface and receiving an impact from the bump, in accordance with unsprung acceleration Gl1, a drive force $\Delta F$ is added to the drive force at the time of running for the left front wheel Wfl (see FIG. 7). For the right front wheel Wfr, in the same manner as for the left front wheel Wfl, a drive force $\Delta F$ is added to the drive force at the time of running for the right front wheel Wfr in accordance with unsprung acceleration Gl2.

Figure 7:
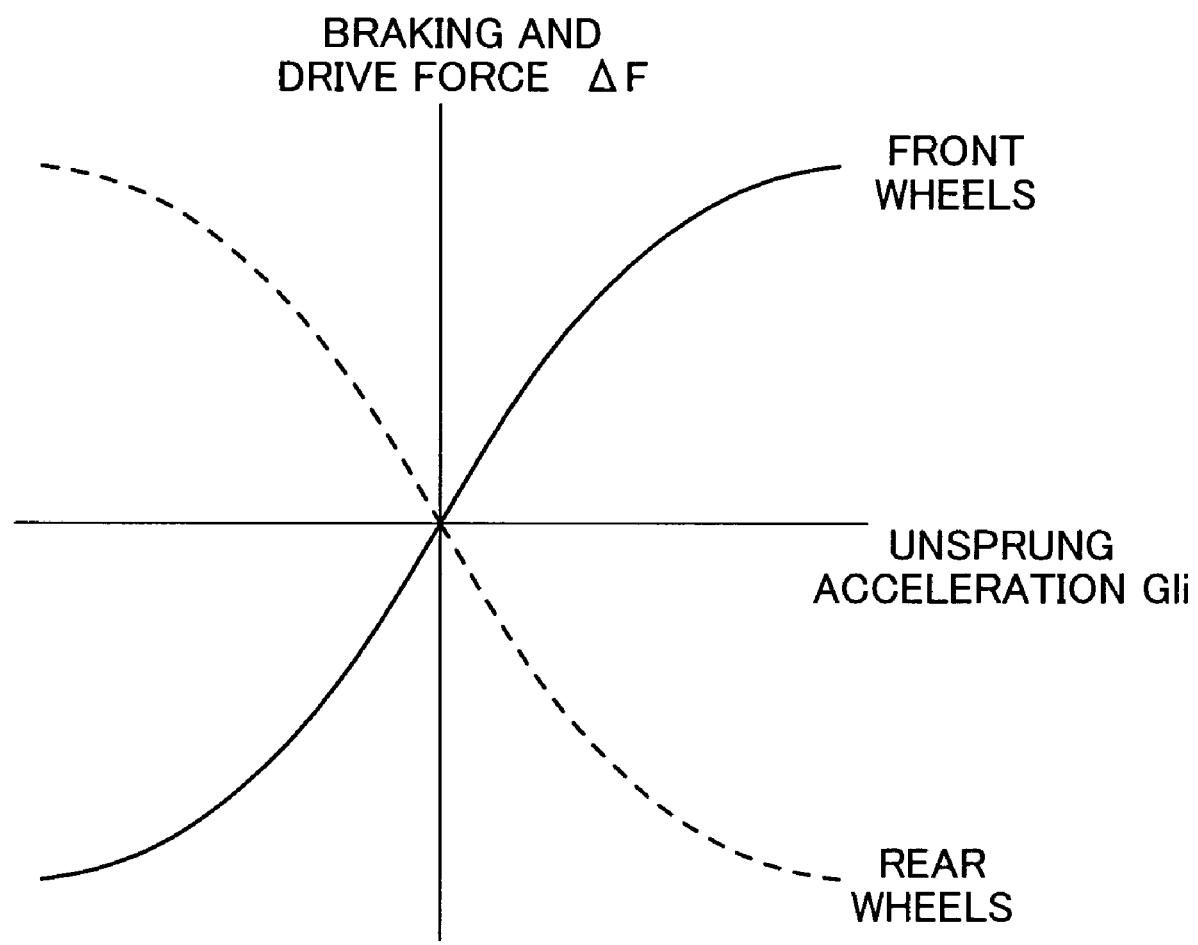
FIG. 7 is a graph showing the braking and drive force as a function of unsprung acceleration.

On the other hand, when the left rear wheel Wrl is experiencing a positive unsprung acceleration Gl3 and the left rear wheel Wrl is rising due to the left rear wheel Wrl riding over a bump in the road surface and receiving an impact from the bump, a braking force $\Delta F$ is added to the drive force at the time of running for the left rear wheel Wrl in accordance with unsprung acceleration Gl3 (see FIG. 7). For the right rear wheel Wrr as well, in the same manner as for the left rear wheel Wrl, a braking force $\Delta F$ is added to the drive force at the time of running for the right rear wheel Wrr in accordance with unsprung acceleration Gl4.

When each of the wheels Wfl, Wfr, Wrl, and Wrr rides over a bump in the road surface and receives an impact from the bump, the ground contact load of each wheel Wfl, Wfr, Wrl, and Wrr increases. Accordingly, in this case, as shown in FIG. 8(A), if a drive force $\Delta F$ is applied to the left front wheel Wfl (the right front wheel Wfr), an upwards force $\Delta Fu$ is generated in the left front wheel Wfl (the right front wheel Wfr) in accordance with this drive force $\Delta F$.

Namely, the drive force $\Delta F$ which is applied to the left front wheel Wfl (the right front wheel Wfr) has a downwards force component acting on suspension Sfl (Sfr) in the direction of the instant center O determined by suspension Sfl (Sfr) and an upwards force component $\Delta Fu$ acting on the ground contact surface of the left front wheel Wfl (right front wheel Wfr). As a result of this upwards force $\Delta Fu$ acting on the ground contact surface of the left front wheel Wfl (the right front wheel Wfr), the left front wheel Wfl (the right front wheel Wfr) is pushed up, so the left front wheel Wfl (the right front wheel Wfr) can move up while following the bump in the road surface. As a result, the ground contact load of the left front wheel Wfl (the right front wheel Wfr) is decreased, and the ability of the front wheels to contact the ground is improved.

As shown in FIG. 8(B), when a braking force $\Delta F$ is applied to the left rear wheel Wrl (the right rear wheel Wrr), in the same manner as with the left front wheel Wfl (the right front wheel Wfr), an upwards force $\Delta Fu$ which acts on the ground contact surface of the left rear wheel Wrl (the right rear wheel Wrr) is generated as a component of the braking force $\Delta F$. Due to the upwards force $\Delta Fu$ which acts on the ground contact surface of the left rear wheel Wrl (right rear wheel Wrr), the left rear wheel Wrl (right rear wheel Wrr) is pushed up, so the left rear wheel Wrl (right rear wheel Wrr) can move up while following the bump in the road surface. As a result, the ground contact load of the left rear wheel Wrl (right rear wheel Wrr) is decreased, and the ability of the rear wheels to contact the ground is improved.

Next, when the left front wheel Wfl is experiencing a negative unsprung acceleration Gl1 and the left front wheel Wfl is descending due to being positioned above a depression following a bump in the road surface, a braking force $\Delta F$ is added to the drive force at the time of running for the left front wheel Wfl in accordance with unsprung acceleration Gl1 (see FIG. 7). For the right front wheel Wfr as well, in the same manner as for the left front wheel Wfl, a braking force $\Delta F$ is added to the drive force at the time of running for the right front wheel Wfr in accordance with unsprung acceleration Gl2.

On the other hand, when the left rear wheel Wrl is experiencing a negative unsprung acceleration Gl3 and the left rear wheel Wrl is descending due to being positioned above a depression following a bump in the road surface, a drive force $\Delta F$ is added to the drive force at the time of running for the left rear wheel Wrl in accordance with unsprung acceleration Gl3 (see FIG. 7). For the right rear wheel Wrr as well, in the same manner as for the left rear wheel Wrl, a drive force $\Delta F$ is added to the drive force at the time of running for the right rear wheel Wrr in accordance with unsprung acceleration Gl4.

When each of the wheels Wfl, Wfr, Wrl, and Wrr is positioned above a depression in the road surface, the area of ground contact with the road surface decreases, so the ground contact load of each of the wheels Wfl, Wfr, Wrl, and Wrr decreases. Accordingly, in this case, as shown in FIG. 8(C), when a braking force ΔF is applied to the left front wheel Wfl (right front wheel Wfr), a downwards force ΔFd is generated in the left front wheel Wfl (right front wheel Wfr) in accordance with the braking force ΔF.

Namely, the braking force ΔF which is applied to the left front wheel Wfl (right front wheel Wfr) has an upwards force component acting on the suspension Sfl (Sfr) in the direction of the instant center O determined by suspension Sfl (Sfr) and a downwards force component ΔFd acting on the ground contact surface of the left front wheel Wfl (right front wheel Wfr). Due to the downwards force ΔFd acting on the ground contact surface of the left front wheel Wfl (right front wheel Wfr), the left front wheel Wfl (right front wheel Wfr) is pulled down, so the left front wheel Wfl (right front wheel Wfr) can move down while following the depression in the road surface. As a result, the ground contact load of the left front wheel Wfl (right front wheel Wfr) is increased, and the ability of the front wheels to contact the ground is improved.

As shown in FIG. 8(D), when a drive force ΔF is applied to the left rear wheel Wrl (right rear wheel Wrr), in the same manner as for the left front wheel Wfl (right front wheel Wfr), a downwards force ΔFd which acts on the ground contact surface of the left rear wheel Wrl (right rear wheel Wrr) is generated as a component of the drive force ΔF. Due to this downwards force ΔFd which acts on the ground contact surface for the left rear wheel Wrl (right rear wheel Wrr), the left rear wheel Wrl (right rear wheel Wrr) is pulled down, so the left rear wheel Wrl (right rear wheel Wrr) can move down while following the depression in the road surface. As a result, the ground contact load of the left rear wheel Wrl (right rear wheel Wrr) is increased, and the ability of the rear wheels to contact the ground is improved.

Figure 9:
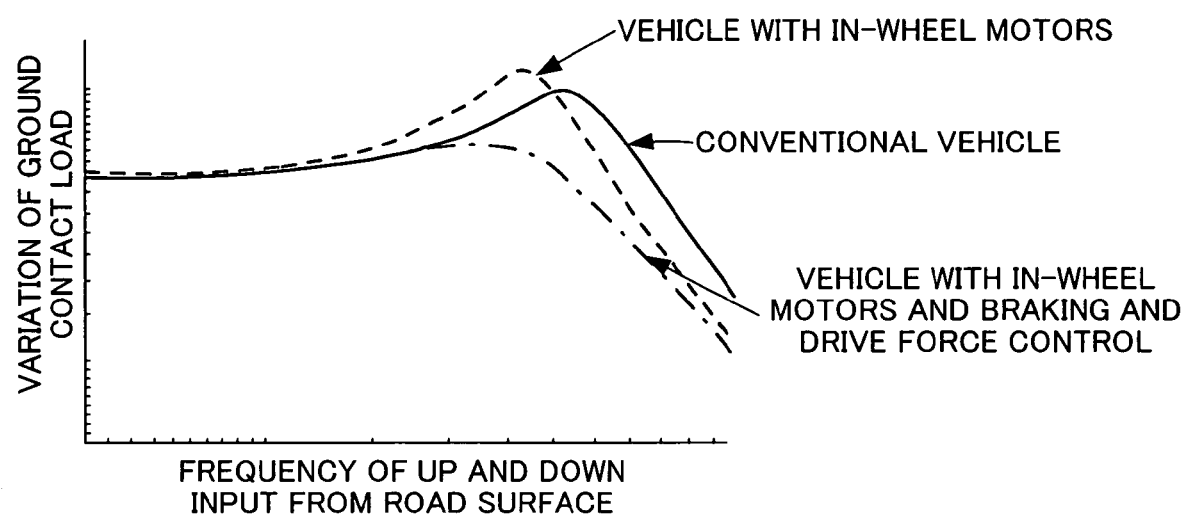
FIG. 9 is a graph showing the variation of ground contact load as a function of the frequency of vibrations input from a road surface for a vehicle which is equipped with in-wheel motors and a braking and drive force control apparatus according to the present invention, for a conventional vehicle, and for a vehicle which is equipped with in-wheel motors but in which ground contact load variation suppressing control is not performed.

If each of the wheels Wfl, Wfr, Wrl, and Wrr is repeatedly undergoing upwards and downwards vibration, the processing of Step S25 and Step S26 is repeatedly executed, and a drive force ΔF or a braking force ΔF is applied to each wheel Wfl, Wfr, Wrl, and Wrr depending on whether the unsprung acceleration Gli (i=1-4) is positive or negative. As a result, as shown in FIG. 9, a vehicle having in-wheel motors and undergoing braking and drive force control suppresses variations in ground contact load compared not only to a vehicle with in-wheel motors which do not undergo braking and drive force control but also compared to a conventional vehicle not equipped with in-wheel motors.

In accordance with the above-described second embodiment, it is not necessary to set suspension components such as coil springs or shock absorbers on the hard side, so ride comfort is maintained, variations in ground contact load are suppressed, and driving stability of the vehicle can be obtained. It is not necessary, for example, to mount each motor on a wheel by means of a damper in order to suppress variations in ground contact load, so the effect is obtained that the structure of the vehicle does not become complicated.

In the above-described second embodiment, the braking and drive force ΔF to be applied to the left and right, front and rear wheels Wfl, Wfr, Wrl, and Wrr is calculated using a braking and drive force table which stores braking and drive forces ΔF which vary in accordance with the unsprung acceleration Gli (i=1-4). The unsprung acceleration Gli (i=1-4) can be sensed in an early stage of control timing, so the time lag from when upwards and downwards vibration of each wheel Wfl, Wfr, Wrl, and Wrr occurs until a braking or drive force ΔF is applied to each wheel can be made small. However, the present invention is not limited to the case in which the braking and drive force ΔF is calculated based on the unsprung acceleration Gli (i=1-4), and the braking and drive force ΔF may be calculated by sensing the unsprung velocity and/or unsprung displacement instead of or in addition to the unsprung acceleration.

Above, first and second embodiments of the present invention and variations thereof have been described, but the present invention is not limited to the above-described embodiments, and various changes are possible while still accomplishing the object of the present invention.

For example, in the first and second embodiments and in variations thereof, the controller 34 stores either a bouncing suppressing control program or a ground contact load variation suppressing control program. However, the controller 34 may store both a bouncing suppressing control program and a ground contact load variation suppressing control program, and in a resonant range of the vehicle body BD, the bouncing suppressing control program of the above-described first embodiment may be executed, and in a resonant range of the wheels, the ground contact load variation suppressing control program of the above-described second embodiment may be executed.

In the above-described first and second embodiments and in variations thereof, the case was described in which the instant centers which are determined by the front suspensions Sfl and Sfr are located above and to the rear of the ground contact surfaces for the front wheels and in which the instant centers determined by the rear suspensions Srl and Srr are located above and forward of the ground contact surfaces for the rear wheels. However, the instant centers are not limited to these positions. For example, the instant centers determined by the front suspensions Sfl and Sfr may be located below and forward of the ground contact surfaces for the front wheels with the instant centers determined by the rear suspensions Srl and Srr being located below and to the rear of the ground contact surfaces for the rear wheels (first variation), or the instant centers determined by the front suspensions Sfl and Sfr may be located above and forward of the ground contact surfaces for the front wheels with the instant centers determined by the rear suspensions Srl and Srr being located above and to the rear of the ground contact surfaces for the rear wheels (second variation), or the instant centers determined by the front suspensions Sfl and Sfr may be located below and to the rear of the ground contact surfaces for the front wheels with the instant centers determined by the rear suspensions Srl and Srr being located below and forward of the ground contact surfaces for the rear wheels (third variation).

In this case, in the first variation, in the same manner as in the first embodiment, when the vehicle body BD is rising, by adding a drive force ΔF to the drive force at the time of running for the front wheels and adding a braking force ΔF to the drive force at the time of running for the rear wheels, a downwards force can be generated at the instant center determined by each suspension. When the vehicle body BD is descending, by adding a braking force ΔF to the drive force at the time of running for the front wheels and adding a drive force ΔF to the drive force at the time of running for the rear wheels, an upwards force can be generated at the instant center determined by each suspension.

In contrast, in the second and third variations, in the reverse of the first embodiment, when the vehicle body BD is rising, by adding a braking force ΔF to the drive force at the time of running for the front wheels and adding a drive force ΔF to the drive force at the time of running for the rear wheels, a downwards force can be generated at the instant center determined by each suspension. In addition, when the vehicle body BD is descending, by adding a drive force ΔF to the drive force at the time of running for the front wheels and adding a braking force ΔF to the drive force at the time of running for the rear wheels, an upwards force can be generated at the instant center determined by each suspension.

In the above-described first variation, in the same manner as in the second embodiment, when a positive unsprung acceleration is generated in the wheels and the wheels are rising, by adding a drive force ΔF to the drive force at the time of running for the front wheels in accordance with the unsprung acceleration, an upwards force ΔFu can be applied to each of the front wheels, and by adding a braking force ΔF to the drive force at the time of running for the rear wheels, an upwards force ΔFu can be applied to each of the rear wheels. In addition, when a negative unsprung acceleration is generated in the wheels and an unsprung member LA is descending, in accordance with the unsprung acceleration, a braking force ΔF is added to the drive force at the time of running for the front wheels, whereby a downwards force ΔFd can be applied to each of the front wheels, and a drive force ΔF is added to the drive force at the time of running for the rear wheels, whereby a downwards force ΔFd can be applied to each of the rear wheels.

In contrast, in the above-described second and third variations, in the reverse of the above-described second embodiment, when a positive unsprung acceleration is generated in the wheels and the wheels are rising, in accordance with the unsprung acceleration, a braking force ΔF is added to the drive force at the time of running for the front wheels, whereby an upwards force ΔFu can be applied to each of the front wheels, and a drive force ΔF is added to the drive force at the time of running for the rear wheels, whereby an upwards force ΔFu can be applied to each of the rear wheels. In addition, when a negative unsprung acceleration is generated in the wheels and the wheels are descending, in accordance with the unsprung acceleration, by adding a drive force ΔF to the drive force at the time of running for the front wheels, a downwards force ΔFd can be applied to each of the front wheels, and by adding a braking force ΔF to the drive force at the time of running for the rear wheels, a downwards force ΔFd can be applied to each of the rear wheels.

What is claimed is:

1. A braking and drive force control apparatus for a vehicle having four actuators that independently drive four wheels that are suspended on a vehicle body by a suspension apparatus, the control apparatus being capable of independently controlling the braking and drive forces generated by the four actuators and comprising:

a vehicle body upwards and downwards vibration sensing means which senses upwards and downwards vibration of the vehicle body caused by variation in ground contact load of at least one of the four wheels; and a braking and drive force control means which, based upon the sensed upwards and downwards vibration of the vehicle body, (i) determines a difference in the braking and drive forces that should be generated by at least one of the four actuators in order to suppress repeated upwards and downwards vibration of the vehicle body, and (ii) drives and controls the four actuators in accordance with the determined difference, so as to thereby apply a force to the vehicle body in a direction for suppressing the repeated upwards and downwards vibration of the vehicle body.

2. A braking and drive force control apparatus for a vehicle as claimed in claim 1, wherein the braking and drive force control means generates forces on the front and rear wheels in opposite directions in the fore and aft direction of the vehicle to thereby generate a downwards force on the vehicle body when the vehicle body has risen and generates forces on the front and rear wheels in opposite directions in the fore and aft direction of the vehicle to thereby generate an upwards force on the vehicle body when the vehicle body has descended.

3. A braking and drive force control apparatus for a vehicle as claimed in claim 1, wherein the vehicle body upwards and downwards vibration sensing means includes sprung acceleration sensors which sense the sprung acceleration of the vehicle body in the upwards and downwards direction with respect to absolute space and a bouncing sensing means which senses bouncing of the vehicle body based on the sprung acceleration which was sensed, and the braking and drive force control means includes a braking and drive force calculating means which calculates the braking and drive forces to be generated by the four actuators in accordance with the sensed bouncing of the vehicle body and a drive force control means which drives and controls the four actuators in accordance with the calculated braking and drive forces.

4. A braking and drive force control apparatus for a vehicle as claimed in claim 3, wherein the bouncing sensing means includes a sprung displacement calculating means which calculates the sprung displacement of the vehicle body in the upwards and downwards direction based on the sensed sprung acceleration and senses bouncing of the vehicle body when the calculated sprung displacement is at least a prescribed value.

5. A braking and drive force control apparatus for a vehicle as claimed in claim 4, wherein the sprung acceleration sensors are mounted on the vehicle body in positions corresponding to the four wheels.

6. A braking and drive force control apparatus for a vehicle as claimed in claim 5, wherein the sprung acceleration sensors send signals that correspond to the sensed sprung acceleration of the vehicle body to the sprung displacement calculating means which converts the sensed sprung acceleration into sprung velocity of the vehicle body in an upwards and downwards direction, and then converts the sprung velocity of the vehicle body into the sprung displacement of the vehicle body in the upwards and downwards direction.

7. A braking and drive force control apparatus for a vehicle as claimed in claim 6, wherein the braking and drive force control means suppresses the sensed upwards and downwards vibration of the vehicle body based upon the calculated sprung displacement of the vehicle body by controlling the four actuators to generate forces on front and rear wheels in opposite directions in a fore and aft direction of the vehicle to thereby generate a downwards force on the vehicle body when the vehicle body has risen and to generate forces on the front and rear wheels in opposite directions in the fore and aft direction of the vehicle to thereby generate an upwards force on the vehicle body when the vehicle body has descended.

* * * * *